(12) United States Patent
Chaudhry et al.

(10) Patent No.: US 7,634,641 B2
(45) Date of Patent: Dec. 15, 2009

(54) METHOD AND APPARATUS FOR USING MULTIPLE THREADS TO SPECTULATIVELY EXECUTE INSTRUCTIONS

(75) Inventors: Shailender Chaudhry, San Francisco, CA (US); Marc Tremblay, Menlo Park, CA (US); Paul Caprioli, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/361,257

(22) Filed: Apr. 24, 2006

(65) Prior Publication Data

US 2006/0212689 A1    Sep. 21, 2006

Related U.S. Application Data

(63) Continuation-in-part of application No. 11/084,655, filed on Mar. 18, 2005, now Pat. No. 7,571,304.

(60) Provisional application No. 60/764,549, filed on Feb. 2, 2006.

(51) Int. Cl.
    *G06F 9/00* (2006.01)
    *G06F 9/40* (2006.01)
(52) U.S. Cl. .................... 712/228; 712/229; 712/218
(58) Field of Classification Search ................. 712/200, 712/228
    See application file for complete search history.

(56) References Cited

U.S. PATENT DOCUMENTS

| 5,659,721 A | | 8/1997 | Shen et al. ................. 395/569 |
| 5,751,985 A | * | 5/1998 | Shen et al. ................. 712/218 |
| 5,881,280 A | * | 3/1999 | Gupta et al. ................. 712/244 |

(Continued)

FOREIGN PATENT DOCUMENTS

EP    0 355 286    2/1990

(Continued)

OTHER PUBLICATIONS

Zahran, M. and Franklin, M. 2003. Dynamic Thread Resizing for Speculative Multithreaded Processors. In Proceedings of the 21st international Conference on Computer Design (Oct. 13-15, 2003). ICCD. IEEE Computer Society, Washington, DC, 313.*

(Continued)

*Primary Examiner*—Eddie P Chan
*Assistant Examiner*—William B Partridge
(74) *Attorney, Agent, or Firm*—Park, Vaughan & Fleming LLP; Anthony P. Jones

(57) ABSTRACT

One embodiment of the present invention provides a system which performs simultaneous speculative threading. The system staffs by executing instructions in normal execution mode using a first thread. Upon encountering a data-dependent stall condition, the first thread generates an architectural checkpoint and commences execution of instructions in execute-ahead mode. During execute-ahead mode, the first thread executes instructions that can be executed and defers instructions that cannot be executed into a deferred queue. When the data dependent stall condition has been resolved, the first thread generates a speculative checkpoint and continues execution in execute-ahead mode. At the same time, the second thread commences execution in a deferred mode. During execution in the deferred mode, the second thread executes instructions deferred by the first thread.

15 Claims, 5 Drawing Sheets

U.S. PATENT DOCUMENTS

| | | |
|---|---|---|
| 6,691,240 B1 | 2/2004 | Stotzer et al. |
| 2001/0029590 A1* | 10/2001 | Sager et al. ................. 713/501 |
| 2004/0154010 A1* | 8/2004 | Marcuello et al. ........... 717/158 |
| 2004/0226011 A1 | 11/2004 | Augsburg et al. |
| 2004/0230778 A1* | 11/2004 | Chou et al. ................. 712/228 |
| 2005/0210223 A1* | 9/2005 | Caprioli et al. ............. 712/220 |

FOREIGN PATENT DOCUMENTS

| | | |
|---|---|---|
| EP | 0779577 A2 | 6/1997 |
| WO | WO 03/093982 | 11/2003 |

OTHER PUBLICATIONS

Iffat H. Kazi et al., "Coarse-Grained Speculative Execution in Shared-Memory Multiprocessors", ICS 98 Melbourne Australia, published Jul. 7, 1998, XP-000895361, pp. 93-100.

Daniel C. McCrackin, "Eliminating Interlocks in Deeply Pipelined Processors by Delay Enforced Multistreaming", IEEE Transactions on Computers 40 (1991) October, No. 10, New York, US, XP 000266019.

* cited by examiner

METHOD AND APPARATUS FOR USING MULTIPLE THREADS TO SPECTULATIVELY EXECUTE INSTRUCTIONS

RELATED APPLICATION

This application is a continuation-in-part of, and hereby claims priority under 35 U.S.C. § 120 to, U.S. patent application Ser. No. 11/084,655, entitled "Generation of Multiple Checkpoints in a Processor that Supports Speculative Execution," by inventors Shailender Chaudhry, Marc Tremblay, and Paul Caprioli, filed on 18 Mar. 2005 now U.S. Pat. No. 7,571,304.

This application hereby claims priority under 35 U.S.C. section 119 to U.S. Provisional Patent Application No. 60/764,549 filed 2 Feb. 2006, entitled "Method and Apparatus for Simultaneous Speculative Threading," by inventors Shailender Chaudhry, Marc Tremblay, and Paul Caprioli.

BACKGROUND

1. Field of the Invention

The present invention relates to techniques for improving the performance of computer systems. More specifically, the present invention relates to a method and apparatus that facilitates simultaneous speculative threading.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

When a memory reference, such as a load operation, generates a cache miss, the subsequent access to level-two (L2) cache (or main memory) can require dozens or hundreds of clock cycles to complete, during which time the processor is typically idle, performing no useful work.

A number of techniques are presently used (or have been proposed) to hide cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster.

Some processors are designed to support "simultaneous multi-threading" (SMT), wherein two or more "threads" of execution run simultaneously on a single processor core. On conventional processors that do not support SMT and can only handle a single execution thread, processor resources can sometimes sit idle (such as when the thread stalls awaiting data return from memory). In an SMT processor that supports multiple threads, processor resources can be employed more efficiently. For example, in one type of SMT processor, a high-priority thread runs on the processor until encountering a stall. At these points, the processor can deactivate the high-priority thread and can activate a low-priority thread. When the high-priority thread requires the processor again, the processor can inactivate the low-priority thread and can reactivate the high-priority thread. In this way, the processor avoids sitting idle while the high-priority thread is not performing useful work.

In an alternative scheme, processor designers have suggested using "speculative-execution" to avoid pipeline stalls associated with cache misses. Two such proposed speculative-execution modes are: (1) execute-ahead mode and (2) scout mode. Execute-ahead mode operates as follows. During normal execution, the system issues instructions for execution in program order. Upon encountering a data-dependent stall condition during execution of an instruction, the system generates a checkpoint that can be used to return execution of the program to the point of the instruction. Next, the system executes subsequent instructions in the execute-ahead mode, wherein instructions that cannot be executed because of a data dependency are deferred, and wherein other non-deferred instructions are executed in program order.

When the unresolved data dependency is resolved during execute-ahead mode, the system enters a deferred execution mode, wherein the system executes deferred instructions. If all deferred instructions are executed during this deferred execution mode, the system returns to normal-execution mode to resume normal program execution from the point where the execute-ahead mode left off. Alternatively, if all deferred instructions are not executed, the system returns to execute-ahead mode until the remaining unresolved data dependencies are resolved and the deferred instructions can be executed.

If the system encounters a non-data-dependent stall condition while executing in normal execution mode or execute-ahead mode, the system moves into scout mode. In scout mode, instructions are speculatively executed to prefetch future loads, but results are not committed to the architectural state of the processor. When the launch point stall condition (the unresolved data dependency or the non-data dependent stall condition that originally caused the system to move out of normal-execution mode) is finally resolved, the system uses the checkpoint to resume execution in normal-execution mode from the launch point instruction (the instruction that originally encountered the launch point stall condition).

By allowing a processor to continue to perform work during stall conditions, speculative-execution can significantly increase the amount of computational work the processor completes.

Unfortunately, existing processor designs that support the above-described type of speculative execution also have limitations. For example, existing processor designs that support speculative execution can only execute one thread of speculative execution at a time. Consequently, the processor may not achieve the maximum possible computational throughput.

Hence, what is needed is a method and apparatus for that increases the amount of simultaneous computational work that can be performed by a processor that supports speculative execution.

SUMMARY

One embodiment of the present invention provides a system which performs simultaneous speculative threading. The system starts by executing instructions in normal execution mode using a first thread. Upon encountering a data-dependent stall condition, the first thread generates an architectural checkpoint and commences execution of instructions in execute-ahead mode. During execute-ahead mode, the first thread executes instructions that can be executed and defers instructions that cannot be executed into a deferred queue. When the data dependent stall condition is eventually resolved, the first thread generates a speculative checkpoint and continues executing in execute-ahead mode. At the same time, the second thread commences execution in a deferred mode, wherein the second thread executes instructions which were deferred by the first thread.

The second thread therefore executes deferred instructions in deferred mode while the first thread continues to speculatively execute instructions in execute-ahead mode.

In a variation of this embodiment, when the second thread completes executing the deferred instructions, if the first thread has not deferred instructions since the second thread entered deferred mode, the first thread discards all previously generated checkpoints and resumes normal-execution mode. At the same time, the second thread resumes wait mode.

In a further variation, when the second thread completes executing the deferred instructions, if the first thread has deferred additional instructions since the second thread entered deferred mode, the first thread discards the architectural checkpoint, converts the speculative checkpoint to the architectural checkpoint, and continues execution in execute-ahead mode. At the same time, the second thread resumes wait mode.

In a further variation, when the data-dependent stall condition which caused the first thread to defer instructions while the second thread was executing in deferred mode is resolved, the first thread performs a speculative checkpoint and continues execution in execute-ahead mode. At the same time, the second thread commences execution in deferred mode, wherein the second thread executes instructions from the deferred queue.

In a variation of this embodiment, if the first thread encounters a non-data dependent stall condition during execute-ahead mode, the first thread generates a speculative checkpoint and commence execution in scout mode. When a data-dependent stall condition which caused the first thread to defer instructions is resolved, the second thread commences execution in a deferred mode, wherein the second thread executes the instructions from the deferred queue.

In a further variation, if the second thread has executed all the instructions in the deferred queue, the first thread is configured to discard the architectural checkpoint, convert the speculative checkpoint to the architectural checkpoint, restore the architectural checkpoint, and resume normal-execution mode with the first thread. At the same time, the second thread resumes wait mode.

In a variation of this embodiment, if the second thread encounters an exception while executing in deferred mode, the first thread discards the speculative checkpoint, restores the architectural checkpoint, and commences execution in normal-execution mode. At the same time, the second thread resumes wait mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
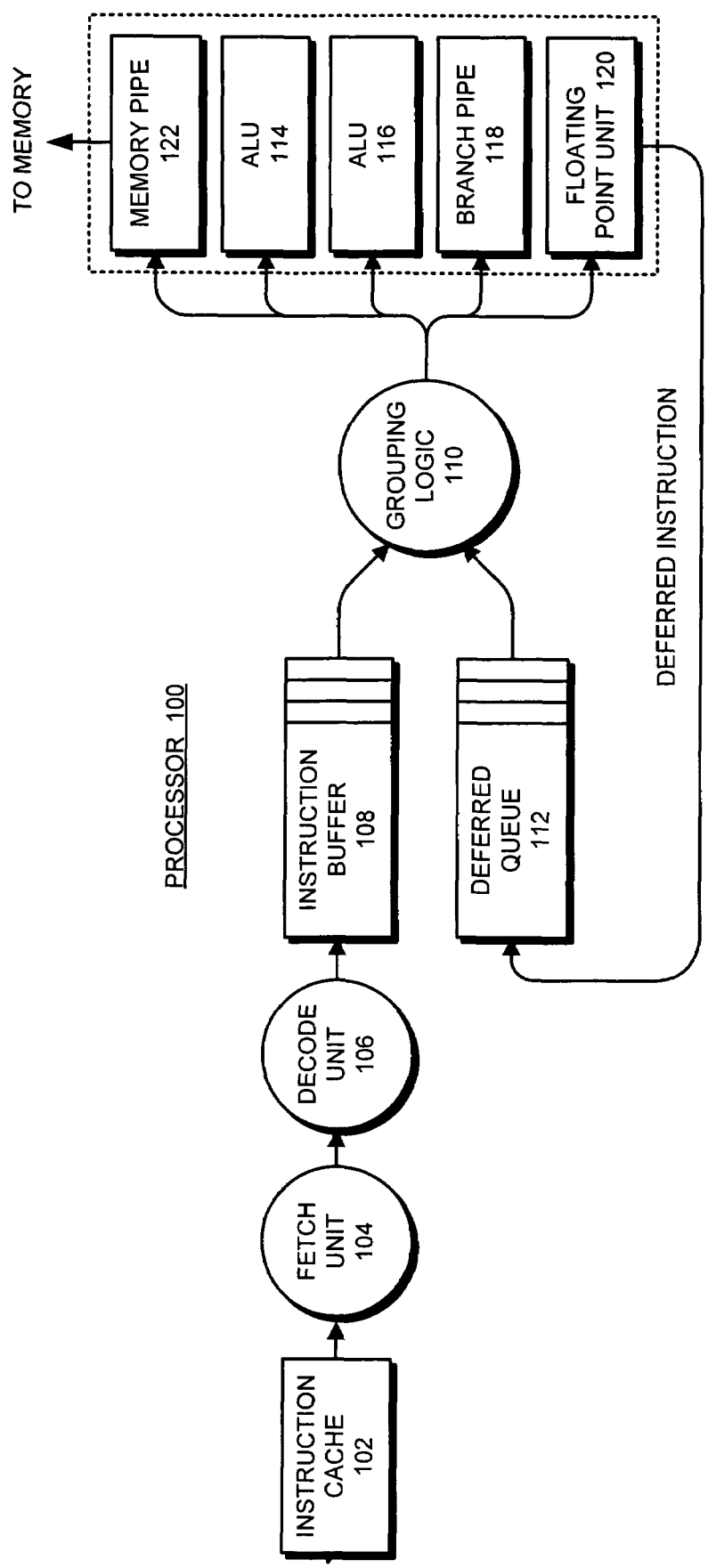
FIG. 1 illustrates the design of a processor that supports speculative-execution in accordance with an embodiment of the present invention.

FIG. 1 illustrates the design of a processor 100 that supports speculative-execution in accordance with an embodiment of the present invention. Processor 100 can generally include any type of processor, including, but not limited to, a microprocessor, a mainframe computer, a digital signal processor, a personal organizer, a device controller, and a computational engine within an appliance. As is illustrated in FIG. 1, processor 100 includes: instruction cache 102, fetch unit 104, decode unit 106, instruction buffer 108, grouping logic 110, deferred queue 112, arithmetic logic unit (ALU) 114, ALU 116, branch pipe 118, and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing remote memory), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred queue 112. Deferred queue 112 is organized as a FIFO buffer.

Processor 100 is configured to support simultaneous multi-threading (SMT), thereby allowing multiple threads of execution to run simultaneously on processor 100. The technical details of SMT are well-known in the art and hence a more detailed description is not provided.

In one embodiment of the present invention, two threads of execution run simultaneously on processor 100. The first thread is "primary thread" 300 (see FIG. 3) and the second thread is "subordinate thread" 302.

Note that the threads are labeled as "primary" and "subordinate" only for the purposes of illustration. The individual threads do not have distinct properties. In other words, either of the threads could serve as the primary thread or subordinate thread. Furthermore, the label "primary" is not associated exclusively with one thread or the other; the designation can switch from one thread to the other at runtime.

Although embodiments of the present invention are described using two threads, alternative embodiments are envisioned with more than two threads. For example, a processor that supports four threads may have three primary threads, while having only one subordinate thread, or vice versa.

Speculative-Execution State Diagrams

Figure 2A:
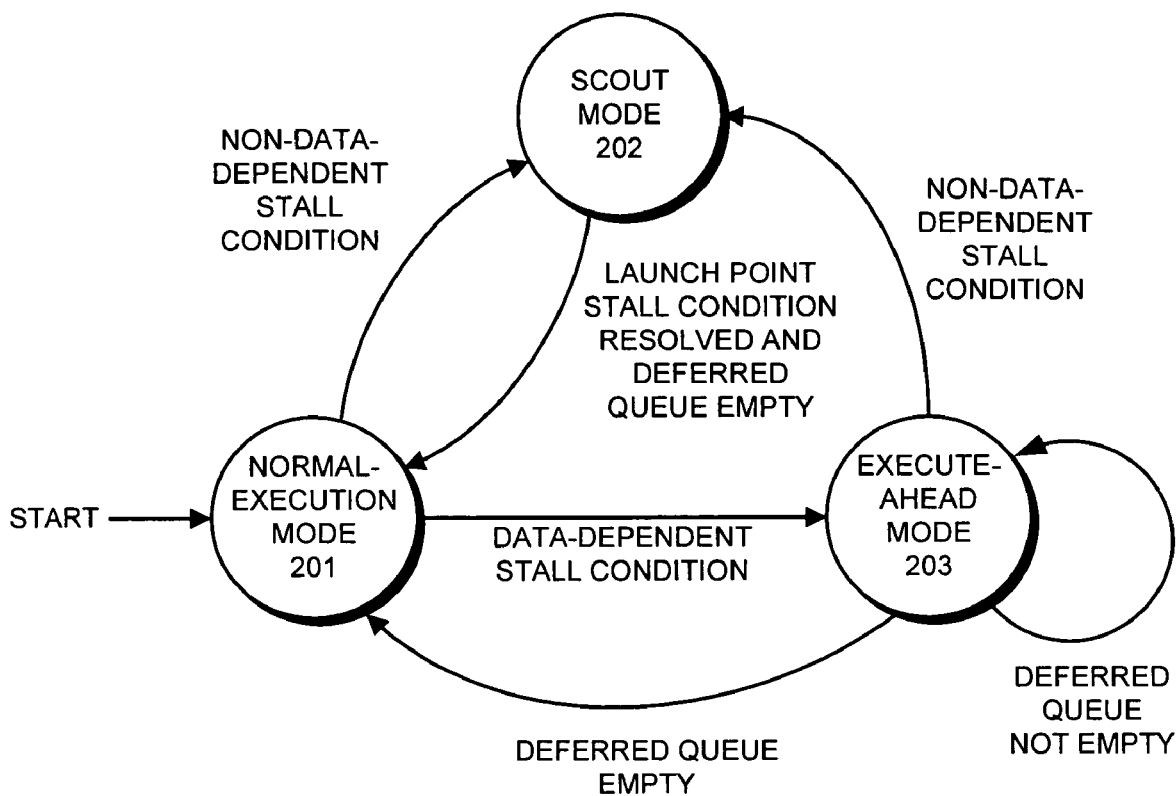
FIG. 2A presents a state diagram which includes a general depiction of normal-mode, scout mode, and execute-ahead mode in accordance with an embodiment of the present invention.
Figure 2B:
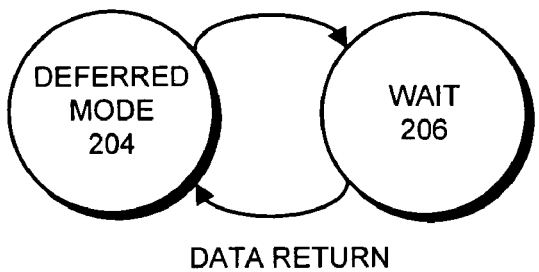
FIG. 2B presents a state diagram which includes a general depiction of deferred mode and wait mode in accordance with an embodiment of the present invention.

FIG. 2A presents a state diagram which includes a depiction of normal-execution mode 201, scout mode 202, and execute-ahead mode 203 for primary thread 300 in accordance with an embodiment of the present invention. FIG. 2B presents a state diagram which includes a depiction of deferred mode 204 and wait mode 206 for subordinate thread 302 in accordance with an embodiment of the present invention.

Referring to FIG. 2A, primary thread 300 starts in normal-execution mode 201, wherein primary thread 300 executes instructions in program order as they are issued from instruction buffer 108 (see FIG. 1). At the same time, referring to FIG. 2B, subordinate thread 302 starts in wait mode 206. In one embodiment of the present invention, subordinate thread 302 is idle while in wait mode 206. In an alternative embodiment, subordinate thread 302 executes low priority instructions while in wait mode 206, but awaits higher priority commands from primary thread 300.

If a data-dependent stall condition arises during the execution of an instruction in normal-execution mode 201, primary thread 300 transitions to execute-ahead mode 203. A data-dependent stall condition can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 203, primary thread 300 generates an architectural checkpoint that can be used, if necessary, to return execution to the point (the "launch point") where the data-dependent stall condition was encountered. Generating this architectural checkpoint involves saving the precise architectural state of processor 100 to facilitate subsequent recovery from exceptions that arise during execute-ahead mode 203. Along with generating the architectural checkpoint, the primary thread 300 "defers" execution of the instruction that encountered the unresolved data dependency by storing the instruction in deferred queue 112 (see FIG. 1B).

While operating in execute-ahead mode 203, primary thread 300 continues to execute instructions in program order as they are received from instruction buffer 108, deferring any instruction that cannot execute because of an unresolved data dependency by storing the instruction in deferred queue 112.

When a data dependency is resolved during execute-ahead mode 203, primary thread 300 signals subordinate thread 302 to leave wait mode 206 and to commence execution in deferred mode 204. In deferred mode 204, subordinate thread 302 attempts to execute each of the deferred instructions in deferred queue 112. In doing so, subordinate thread 302 attempts to execute these instructions in program order with respect to other deferred instructions in deferred queue 112; but not with respect to non-deferred instructions previously executed by primary thread 300, and not with respect to deferred instructions executed in any other passes through deferred queue 112. During deferred mode 204, subordinate thread 302 re-defers execution of deferred instructions that still cannot be executed because of unresolved data dependencies by placing the re-defered instructions back into deferred queue 112 in program order.

Before subordinate thread 302 commences the execution of deferred instructions from deferred queue 112, primary thread 300 updates a "deferred queue indicator" associated with deferred queue 112. This indicator prevents subordinate thread 302 from executing deferred instructions which were deferred by primary thread 300 after subordinate thread 302 has begun executing in deferred mode 204.

Along with adjusting the deferred queue indicator, primary thread 300 also generates a "speculative" checkpoint. As with an architectural checkpoint, generating a speculative checkpoint involves saving the precise architectural state of processor 100 to facilitate subsequent recovery from exceptions. However, unlike the architectural checkpoint, the speculative checkpoint is initially "inactive." This means that processor 100 does not return to the speculative checkpoint in the event of an exception. Instead, processor 100 continues to return to the architectural checkpoint in the event of an exception. The architectural checkpoint remains the active checkpoint until all of the deferred instructions in the program code between the architectural checkpoint and the speculative checkpoint are executed by subordinate thread 302 in deferred mode 204. When these deferred instructions are successfully executed, processor 100 removes the architectural checkpoint and activates the speculative checkpoint. In the process, the speculative checkpoint "becomes" the architectural checkpoint, which is the checkpoint returned to by processor 100 in the event of an exception. Note that using the speculative checkpoint facilitates using subordinate thread 302 to execute the instructions deferred by primary thread 300.

Primary thread 300 retains the architectural checkpoint until the speculative checkpoint is properly updated because subordinate thread 302 could encounter an exception while executing the deferred instructions in deferred mode 204. In the event that subordinate thread 302 encounters such an exception, subordinate thread 302 signals primary thread 300 that an exception has occurred. Subordinate thread 302 then halts execution in deferred mode 204 and resumes wait mode 206. Upon receiving the signal, primary thread 300 restores the architectural checkpoint and resumes execution in normal-execution mode 201.

Because the architectural checkpoint still exists, generating the speculative checkpoint involves generating multiple checkpoints on a single processor 100. The process of generating multiple checkpoints on a single processor is described in more detail in a pending U.S. patent application entitled, "The Generation of Multiple Checkpoints in a Processor that Supports Speculative Execution," by inventors Shailender Chaudhry, Marc Tremblay, and Paul Caprioli having Ser. No. 11/084,655, and filing date 18 Mar. 2005, and which is hereby incorporated by reference to describe implementation details of generating multiple checkpoints.

Primary thread 300 continues to execute instructions in execute-ahead mode 203, deferring any instructions that cannot execute because of unresolved dependencies to deferred queue 112.

After subordinate thread 302 completes a pass through deferred queue 112 in deferred mode 204, some re-deferred instructions may remain to be executed. If so, subordinate thread 302 shifts to wait mode 206 and waits for another data return to commence executing the re-deferred instructions. When another data return occurs, subordinate thread 302 leaves wait mode 206 and commences execution in deferred mode 204, making another pass through deferred queue 112. Note that subordinate thread 302 continues to make passes through deferred queue 112 until all the deferred instructions (at locations before the deferred queue indicator) in deferred queue 112 have been executed.

When the deferred instructions before the deferred queue indicator have been executed, subordinate thread 302 asserts the deferred-queue-empty signal that is communicated to primary thread 300 and returns to wait mode 206. Upon receiving this signal, primary thread 300 discards the architectural checkpoint and activates the speculative checkpoint.

Primary thread 300 then checks the status of deferred queue 112. If primary thread 300 deferred instructions into deferred queue 112 while subordinate thread 302 was executing in deferred mode 204, primary thread 300 continues to operate in execute-ahead mode 203. In a variation of this embodiment, primary thread 300 immediately takes another speculative checkpoint before continuing in execute-ahead mode 203. When data returns for these deferred instructions, primary thread 300 signals subordinate thread 302 to leave wait mode 206 and commence execution in deferred mode 204. In deferred mode 204, subordinate thread 302 executes the instructions which were deferred to deferred queue 112 by primary thread 300.

Unless subordinate thread 302 executes all the deferred instructions preceding the deferred queue indicator at a time when primary thread 300 has not deferred any further instructions, the threads may continuously repeat this type of pattern—with primary thread 300 executing instructions which can be executed and deferring those which cannot be executed, and subordinate thread 302 trailing primary thread 300, executing the deferred instructions in deferred mode 204.

Otherwise, the subordinate thread 302 eventually empties deferred queue 112, primary thread 300 discards all checkpoints and returns to normal-execution mode 201. When primary thread 300 returns to normal-execution mode 201, subordinate thread 302 remains in wait mode 206.

Scout Mode

If a non-data dependent stall condition, such as a memory barrier operation or a deferred queue full condition, arises while primary thread 300 is in normal-execution mode 201, primary thread 300 sets an architectural checkpoint and moves into scout mode 202. In scout mode 202, primary thread 300 speculatively executes instructions to prefetch future loads, but does not commit the results to the architectural state of processor 100. At the same time, subordinate thread 302 remains in wait mode 206.

Scout mode 202 is described in more detail in a pending U.S. patent application entitled, "Generating Prefetches by Speculatively Executing Code Through Hardware Scout Threading," by inventors Shailender Chaudhry and Marc Tremblay, having serial number 10/741,944, and filing date 19 Dec. 2003, which is hereby incorporated by reference to describe implementation details of scout mode 202.

Alternatively, if a non-data dependent stall condition arises while primary thread 300 is in execute-ahead mode 203, primary thread 300 sets a speculative checkpoint and moves into scout mode 202.

When data returns for the original data-dependent stall condition, primary thread 300 signals subordinate thread 302 to leave wait mode 206 and commence execution in deferred mode 204.

If an exception arises for subordinate thread 302 while subordinate thread 302 is operating in deferred mode 204, subordinate thread 302 halts execution in deferred mode 204 and returns to wait mode 206. Processor 100 then restores the architectural checkpoint for primary thread 300, discards all checkpoints and resumes operation in normal-execution mode 201.

Assuming that no exceptions arise, subordinate thread 302 executes the deferred instructions in deferred queue 112, re-deferring instructions with unresolved data dependencies. If subordinate thread 302 was unable to execute all the instructions because of remaining unresolved data dependencies, subordinate thread 302 returns to wait mode 206 to await further data return. Alternatively, subordinate thread 302 signals primary thread 300 that the deferred instructions have been executed and returns to wait mode 206.

Upon receiving the deferred-queue-empty signal from subordinate thread 302, primary thread 300 discards the architectural checkpoint and activates the speculative checkpoint. When both the non-data dependent stall condition is resolved and the checkpoint is updated, primary thread 300 resumes normal-execution mode 201 from the updated checkpoint.

Execution Threads and the Corresponding Deferred Queues

Figure 3:
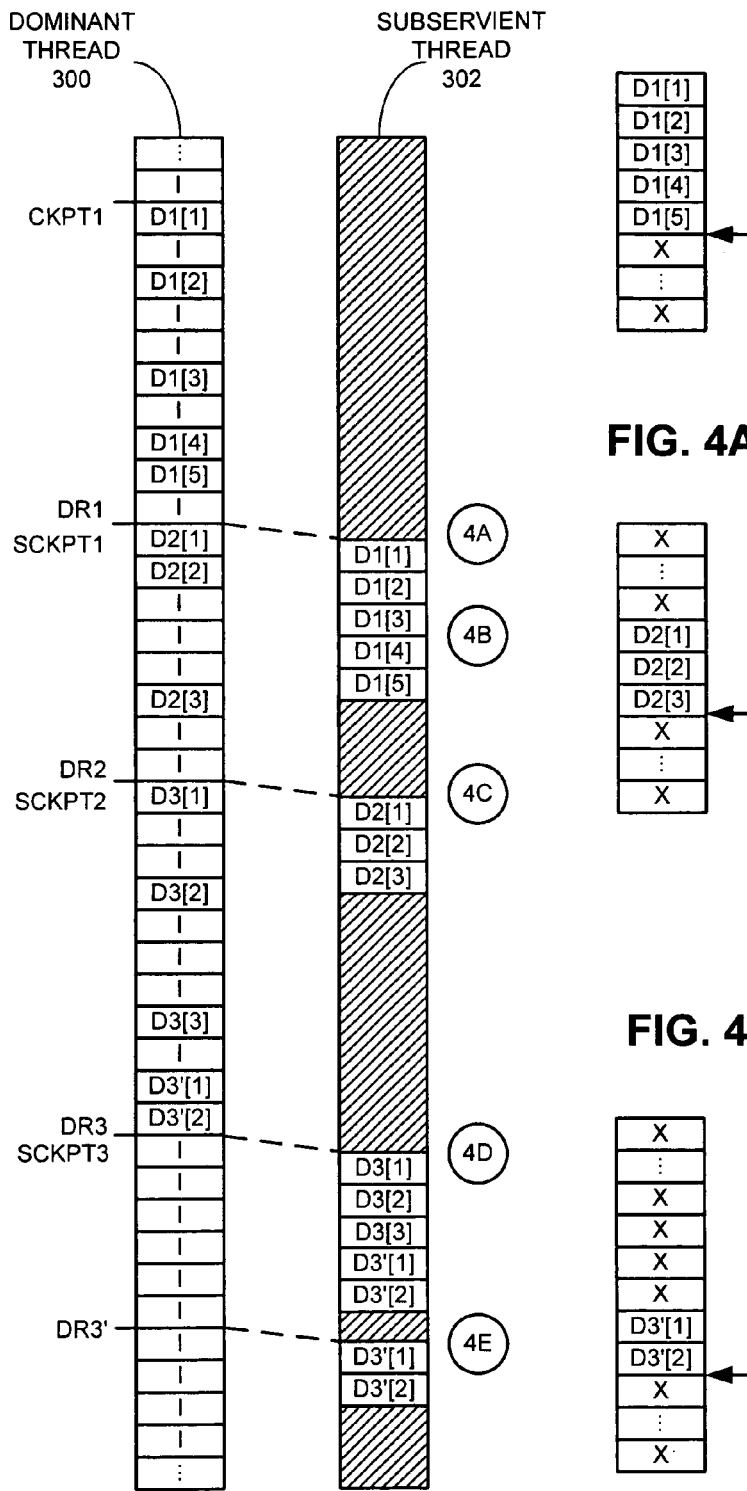
FIG. 3 illustrates two execution threads in an accordance with an embodiment of the present invention.

FIG. 3 illustrates primary thread 300 and subordinate thread 302 are two threads which execute concurrently on an SMT processor 100 (see FIG. 1).

Figures 4A, 4B:
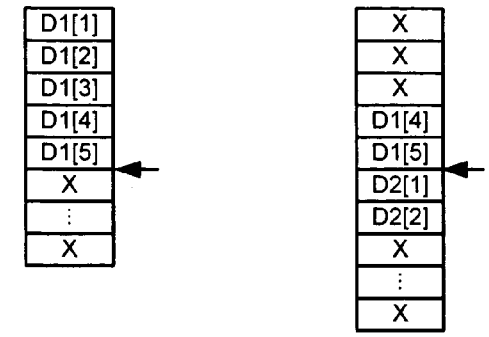
FIG. 4A illustrates a deferred queue corresponding to the execution threads in FIG. 3 in accordance with an embodiment of the present invention.
FIG. 4B illustrates a deferred queue corresponding to the execution threads in FIG. 3 in accordance with an embodiment of the present invention.

FIGS. 4A-4F illustrate successive states of a deferred queue in accordance with an embodiment of the present invention. For example, FIG. 4A represents the state of deferred queue 112 at a time corresponding to the encircled "4A" next to subordinate thread 302, FIG. 4B represents the state of deferred queue 112 at a time corresponding to the encircled "4B" next to subordinate thread 302, and so on.

Deferred queue 112 includes a "deferred queue indicator" that is shown as an arrow in FIGS. 4A-4D. This indicator prevents subordinate thread 302 from executing deferred instructions which were deferred after subordinate thread 302 enters deferred mode 204. Limiting the deferred instructions executed by subordinate thread 302 in this way facilitates updating the architectural checkpoint as described in the following paragraphs.

The hash-marked area within the rectangle representing subordinate thread 302 indicates a time when subordinate thread 302 is in wait mode, while each block within the threads (which are marked "I" or "D") represents the attempted execution of an instruction from the executable code for a program. The "I" instructions are successfully executed, while the "D" instructions are deferred. The architectural checkpoint in the sequence is marked "CKPT," the speculative checkpoints are marked "SCKPT," and the data returns are marked "DR."

The sequence starts with primary thread 300 executing instructions in normal-execution mode 201 while subordinate thread 302 is in wait mode 206. Next, primary thread 300 attempts to execute instruction D1[1], which encounters an data-dependent stall condition. At this point, primary thread 300 generates architectural checkpoint CKPT1, defers instruction D1[1], and commences execution in execute-ahead mode 203. While executing in execute-ahead mode 203, primary thread 300 defers the remaining D1 instructions before the data required by instruction D1[1] returns at DR1. As illustrated in FIG. 4A, at DR1 deferred queue 112 holds deferred instructions D1[1-5].

When the data returns at DR1, primary thread 300 generates a speculative checkpoint SCKPT1 and signals subordinate thread 302 to leave wait mode 206 and commence the execution of the deferred instructions from deferred queue 112 in deferred mode 204. Primary thread 300 then continues executing instructions in execute-ahead mode 203.

At the same time, subordinate thread 302 executes deferred instructions D1[1-5] in deferred mode 204. As illustrated in FIG. 4B, after executing the first three deferred instructions (D1[1-3]), deferred queue 112 holds four deferred instructions; two of the instructions were deferred before data return DR1 (D1[4-5]) and two were deferred after DR1 (D2[1-2]).

After completing the execution of the D1 deferred instructions, subordinate thread 302 asserts the "deferred-queue-empty" signal to primary thread 300 and then returns to wait mode 206. Upon receiving the deferred-queue-empty signal from subordinate thread 302, primary thread 300 discards architectural checkpoint CKPT1 and activates speculative checkpoint SCKPT1, making checkpoint SCKPT1 the architectural checkpoint for primary thread 300. Hence, upon encountering an exception, primary thread 300 no longer returns to CKPT1, but instead returns to SCKPT1. Updating the checkpoint is possible because either primary thread 300 (in execute-ahead mode 203) or subordinate thread 302 (in deferred mode 204) has successfully executed each of the instructions between CKPT1 and SCKPT1, making the architectural state of the processor consistent up to SCKPT1.

Figures 4C, 4D:
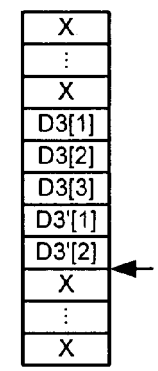
FIG. 4C illustrates a deferred queue corresponding to the execution threads in FIG. 3 in accordance with an embodiment of the present invention.
FIG. 4D illustrates a deferred queue corresponding to the execution threads in FIG. 3 in accordance with an embodiment of the present invention.

Next, primary thread 300 continues in execute-ahead mode 203, deferring one more instruction (D2[3]) before data return DR2. As illustrated in FIG. 4C, at DR2 deferred queue 112 holds deferred instructions D2[1-3].

When the data returns at DR2, primary thread 300 generates a speculative checkpoint SCKPT2 and signals subordinate thread 302 to leave wait mode 206 and commence the execution of the D2[1-3] deferred instructions in deferred mode 204. Primary thread 300 then continues executing instructions in execute-ahead mode 203.

Subordinate thread 302 completes the execution of the D2 deferred instructions in deferred mode 204, signals primary thread 300 that the execution is complete, and then returns to wait mode 206. Upon receiving the signal from subordinate thread 302, primary thread 300 discards architectural checkpoint SCKPT1 and activates speculative checkpoint SCKPT2, making checkpoint SCKPT2 the architectural checkpoint for primary thread 300.

While subordinate thread 302 executes the D2 deferred instructions, primary thread 300 continues executing in execute-ahead mode 203, deferring three D3 instructions and two D3' instructions before data returns for deferred instruction D3[1] at data return DR3. As illustrated in FIG. 4D, at DR3 deferred queue 112 holds the D3 deferred instructions as well as the D3' deferred instructions.

When the data returns at DR3, primary thread 300 generates a speculative checkpoint SCKPT3 and signals subordinate thread 302 to leave wait mode 206 and commence the execution of the D3 and D3' deferred instructions in deferred mode 204. Primary thread 300 then continues the execution of instructions in execute-ahead mode 203.

Next, subordinate thread 302 attempts to execute the D3 and D3' deferred instructions in deferred mode 204. Subordinate thread 302 is able to execute the D3 deferred instructions but encounters a as-yet unresolved data dependency for the D3' deferred instructions. Hence, subordinate thread 302 re-defers the D3' instructions. Subordinate thread 302 then resumes wait mode 206, awaiting the return of the data necessary to execute the D3' deferred instructions.

When data returns at DR3', primary thread 300 signals subordinate thread 302 to leave wait mode 206 and commence the execution of the D3' deferred instructions in deferred mode 204. As illustrated in FIG. 4D, at DR3' deferred queue 112 holds the D3' deferred instructions. Primary thread 300 then continues the execution of instructions in execute-ahead mode 203.

Figures 4E, 4F:
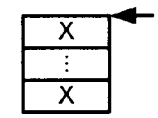
FIG. 4E illustrates a deferred queue corresponding to the execution threads in FIG. 3 in accordance with an embodiment of the present invention.
FIG. 4F illustrates a deferred queue corresponding to the execution threads in FIG. 3 in accordance with an embodiment of the present invention.

At the same time, subordinate thread 302 executes the D3' deferred instructions in deferred mode 204, signals primary thread 300 after completing the execution of the D3' deferred instructions, and then returns to wait mode 206. Upon receiving the signal from subordinate thread 302, primary thread 300 determines whether or not deferred queue 112 contains any deferred instructions. Because no instructions were deferred following SCKPT3, deferred queue 112 is empty (as illustrated in FIG. 4F). Consequently, primary thread 300 discards all checkpoints and resumes execution in normal-execution mode 201.

SMT Execute-Ahead Mode Process

Figure 5:
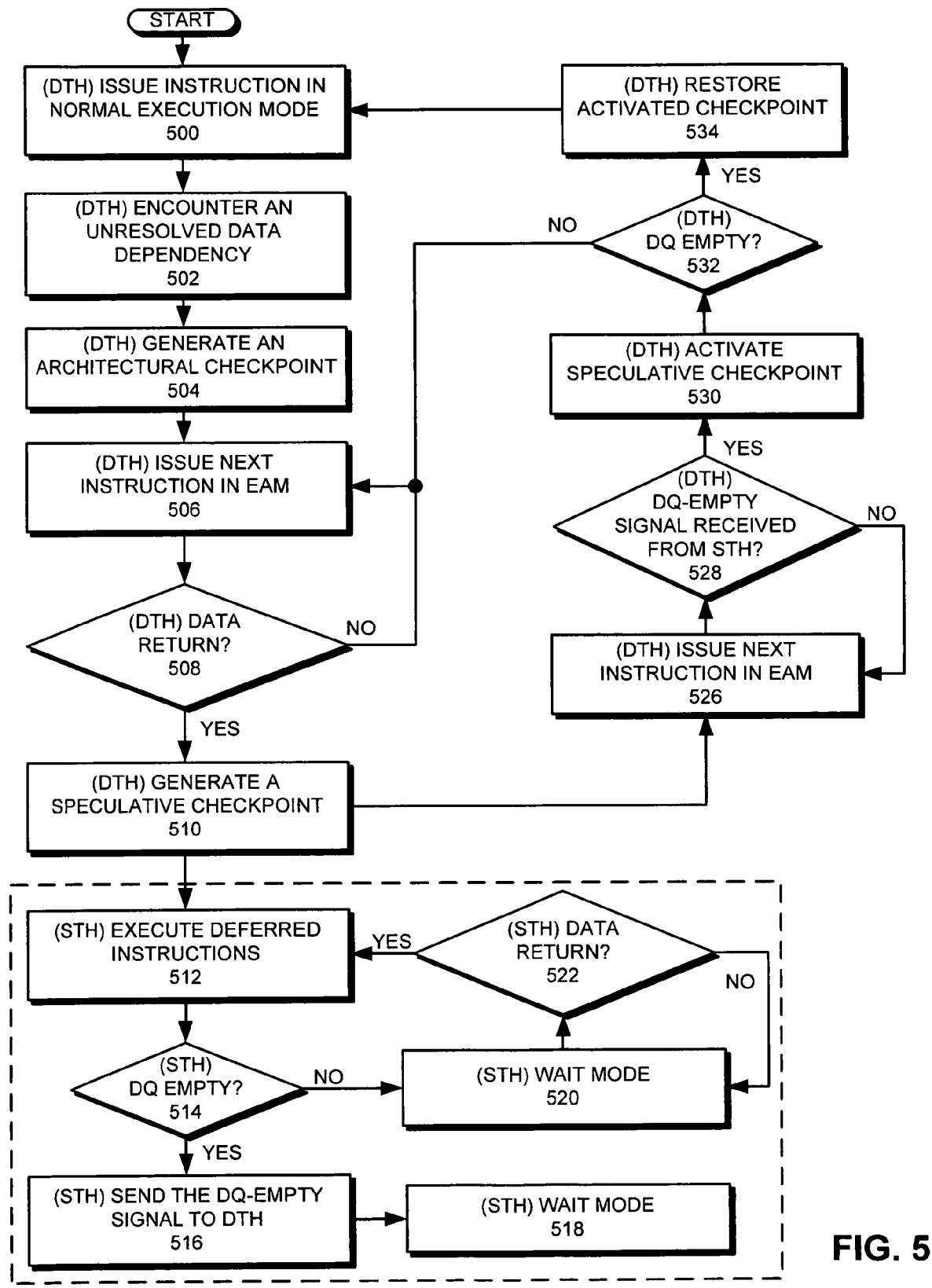
FIG. 5 presents a flow chart illustrating the operation of a primary thread and a subordinate thread on an SMT processor in accordance with an embodiment of the present invention.

FIG. 5 presents a flowchart illustrating the operation of a primary thread 300 and a subordinate thread 302 on an SMT processor in accordance with an embodiment of the present invention. Portions of FIG. 5 illustrate the operation of primary thread 300, while other portions illustrate the operation of subordinate thread 302. A dashed box on the lower left side of FIG. 5 distinguishes the operations of subordinate thread 302. Furthermore, each block in the flowchart is marked with either a "PTHR" or a "STHR," to represent the thread that performs the action. If primary thread 300 performs the action, the block is marked PTHR. Otherwise, subordinate thread 302 performs the action and the block is marked STHR.

The process starts with primary thread 300 issuing an instruction for execution in normal-execution mode 201 (step 500). The instruction ("launch instruction") encounters an unresolved data dependency (step 502), so primary thread 300 generates an architectural checkpoint (step 504) and issues the next instruction in execute-ahead mode 203 (EAM) (step 506). Primary thread 300 then continues executing in EAM, executing instructions that can be executed and deferring instructions that encounter an unresolved data dependency.

While primary thread 300 is executing instructions in EAM, the data for the launch instruction returns (step 508). When data returns, primary thread 300 sets a speculative checkpoint (step 510) and signals subordinate thread 302 to leave wait mode 206 and commence execution in deferred mode 204. While signaling subordinate thread 302, primary thread 300 sets the deferred queue indicator to indicate the instructions that were deferred before subordinate thread 302 entered deferred mode 204. Primary thread 300 continues to execute instructions in execute-ahead mode 203 (step 526).

Subordinate thread 302 next commences the execution of the deferred instructions in deferred mode 204 in parallel with primary thread 300 operating in execute-ahead mode 203

(step 512). While executing in deferred mode 204, subordinate thread 302 attempts to execute only the deferred instructions were deferred before the deferred queue indicator.

If subordinate thread 302 is forced to re-defer instructions to deferred queue 112 due to remaining unresolved data dependencies, subordinate thread 302 does not empty deferred queue 112 (step 514), but returns to wait mode 206 (step 520) and await the return of the necessary data (step 522). When the data returns subordinate thread 302 again attempts to execute the instructions in deferred queue 112 (step 512). This process repeats until all the deferred instructions (before the deferred queue indicator) have been executed.

When all the deferred instructions before the deferred queue indicator have been executed (step 514), subordinate thread 302 sends a "deferred-queue-empty" signal to primary thread 300 (step 516) and returns to wait mode 206 (step 518).

While subordinate thread 302 executes in deferred mode 204, primary thread 300 continues to issue instructions in execute-ahead mode 203 (step 526). While issuing these instructions, primary thread 300 polls the deferred-queue-empty signal from subordinate thread 302 (step 528). When the deferred-queue-empty signal is detected, primary thread 300 discards the architectural checkpoint and activates the speculative checkpoint, thereby updating the checkpoint.

Primary thread 300 next determines if deferred queue 112 holds any deferred instructions (step 532). If deferred queue 112 is not empty, primary thread 300 issues the next instruction in execute-ahead mode 203 (step 506) and awaits a data return (step 508). When the data returns, primary thread 300 generates a speculative checkpoint (step 510) and signals subordinate thread 302 to leave wait mode 206 and commence the execution of the instructions deferred in deferred queue 112 in deferred mode 204. Primary thread 300 then issues the next instruction in EAM (step 526).

Alternatively, if deferred queue 112 is completely empty (both before and after the deferred queue indicator) (step 532), primary thread 300 restores the checkpoint (step 534), returns to step 500, and issues the next instruction normal-execution mode 201.

SMT Scout Mode Process

Figure 6:
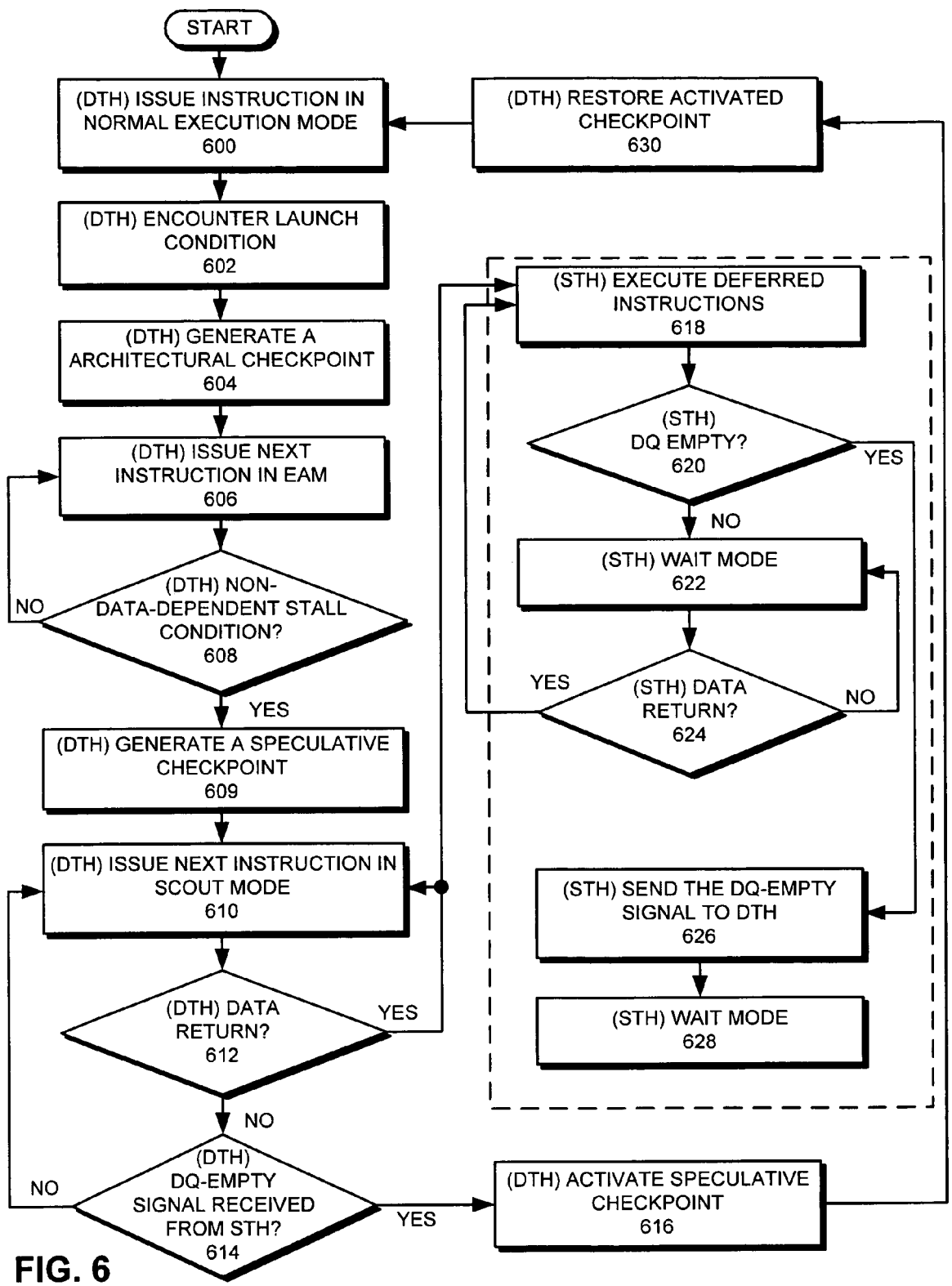
FIG. 6 presents a flow chart illustrating the operation of a primary thread and a subordinate thread on an SMT processor in accordance with an embodiment of the present invention.

FIG. 6 presents a flow chart illustrating the operation of a primary thread 300 and a subordinate thread 302 on an SMT processor in accordance with an embodiment of the present invention. Portions of FIG. 6 illustrate the operation of primary thread 300, while other portions illustrate the operation of subordinate thread 302. A dashed box on the right side of FIG. 6 distinguishes the operations of subordinate thread 302. Furthermore, each block in the flowchart is marked with either a "PTHR" or a "STHR," to represent the thread that performs the action. If primary thread 300 performs the action, the block is marked PTHR. Otherwise, subordinate thread 302 performs the action and the block is marked STHR.

The process starts with primary thread 300 issuing an instruction for execution in normal-execution mode 201 (step 600). The instruction "launch instruction") encounters an unresolved data dependency (step 602) so primary thread 300 generates an architectural checkpoint (step 604) and issues the next instruction in EAM (step 606).

Primary thread 300 continues executing in EAM, executing instructions that can be executed and deferring instructions that encounter an unresolved data dependency, until encountering a non-data-dependent stall condition (step 608). Upon encountering a non-data-dependent stall condition, primary thread 300 generates a speculative checkpoint (step 609) and issues the next instruction in scout mode 202 (step 610).

When data returns (step 612), primary thread 300 signals subordinate thread 302 to leave wait mode 206 and commence the execution of the instructions in deferred mode 204 (step 618). Primary thread 300 then continues execution in scout mode 202 (step 610).

If subordinate thread 302 is forced to re-defer instructions to deferred queue 112 due to remaining unresolved data dependencies, subordinate thread 302 does not empty deferred queue 112 (step 620), but returns to wait mode 206 (step 622) and await the return of the necessary data (step 624). When the data returns, subordinate thread 302 again attempts to execute the instructions in deferred queue 112 (step 618). This process repeats until deferred queue 112 is empty.

When the deferred queue 112 is empty (step 620), subordinate thread 302 sends a "deferred-queue-empty" signal to primary thread 300 (step 626) and returns to wait mode 206 (step 628).

While subordinate thread 302 executes in deferred mode 204, primary thread 300 continues to issue instructions in scout mode 202 (step 610). While issuing these instructions, primary thread 300 polls the deferred-queue-empty signal from subordinate thread 302 (step 614). When subordinate thread 302 asserts the deferred-queue-empty signal, primary thread 300 discards the architectural checkpoint and activates the speculative checkpoint, thereby updating the speculative checkpoint (step 616).

Primary thread 300 then restores the updated checkpoint (step 630) and then returns to step 600 to issue the next instruction in normal-execution mode 201.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing simultaneous speculative threading, comprising:

executing instructions in a normal execution mode using a first thread;

upon encountering a data-dependent stall condition during an instruction, generating an architectural checkpoint and commencing execution of instructions in execute-ahead mode, wherein the first thread executes instructions that can be executed and defers instructions that cannot be executed into a deferred queue, wherein the deferred queue is a first-in-first-out (FIFO) buffer, and wherein deferring the instructions involves storing the instruction that encountered the data-dependent stall condition and subsequent dependent instructions in program order in the deferred queue;

when the data dependent stall condition has been resolved, generating a speculative checkpoint and continuing execution in execute-ahead mode with the first thread, and, at the same time, commencing execution in a deferred mode using a second thread, wherein the second thread executes instructions from the deferred queue, and wherein the speculative checkpoint and the architectural checkpoint exist simultaneously;

wherein if the second thread encounters an exception while executing in deferred mode, the first thread restores the architectural checkpoint and resumes execution in normal-execution mode and the second thread commences operation in a wait mode;

whereby the second thread can execute deferred instructions in deferred mode while the first thread continues to speculatively execute instructions in execute-ahead mode.

2. The method of claim 1, wherein when the second thread completes executing the deferred instructions, if the first thread has not deferred instructions since the second thread entered deferred mode, the method further comprises:

resuming wait mode with the second thread;
discarding all previously generated checkpoints; and
resuming normal-execution mode with the first thread.

3. The method of claim 2, wherein when the second thread completes executing the deferred instructions, if the first thread has deferred additional instructions since the second thread entered deferred mode, the method further comprises:

discarding the architectural checkpoint;
converting the speculative checkpoint to the architectural checkpoint;
resuming wait mode with the second thread; and
continuing execution in execute-ahead mode with the first thread.

4. The method of claim 3, wherein when a data-dependent stall condition which caused the first thread to defer instructions while the second thread was executing in deferred mode is resolved, the method further comprises:

performing a speculative checkpoint and continuing execution in execute-ahead mode with the first thread; and
commencing execution in deferred mode using the second thread, wherein the second thread executes instructions from the deferred queue.

5. The method of claim 1, wherein if the first thread encounters a non-data dependent stall condition during execute-ahead mode, the method further comprises:

generating a speculative checkpoint and commencing execution in scout mode using the first thread; and
when the data-dependent stall condition which caused the first thread to defer instructions is resolved, commencing execution in a deferred mode using the second thread, wherein the second thread executes instructions from the deferred queue.

6. The method of claim 5, wherein when the second thread has executed all the instructions in the deferred queue, the method further comprises:

resuming wait mode with the second thread;
discarding the architectural checkpoint;
converting the speculative checkpoint to the architectural checkpoint;
restoring the architectural checkpoint; and
resuming normal-execution mode with the first thread.

7. The method of claim 1, wherein performing an architectural checkpoint or a speculative checkpoint involves storing processor state information including a program counter and register values that are not waiting for unresolved data dependencies.

8. An apparatus for performing simultaneous speculative threading, comprising:

a processor;
a memory coupled to the processor, wherein data and instructions necessary to the operation of the processor are stored in and retrieved from the memory;
a first thread on the processor;
a second thread on the processor;
wherein the first thread is configured to execute instructions in a normal execution mode;
wherein, upon encountering a data-dependent stall condition, the first thread is configured to generate an architectural checkpoint and commence execution of instructions in execute-ahead mode, wherein the first thread executes instructions that can be executed and defers instructions that cannot be executed into a deferred queue, wherein the deferred queue is a first-in-first-out (FIFO) buffer, and wherein deferring the instructions involves storing the instruction that encountered the data-dependent stall condition and subsequent dependent instructions in program order in the deferred queue;
wherein when the data dependent stall condition has been resolved, the first thread is configured to generate a speculative checkpoint and continue execution in execute-ahead mode and, at the same time, the second thread is configured to commence execution in a deferred mode, wherein the second thread executes the instructions from the deferred queue, and wherein the speculative checkpoint and the architectural checkpoint exist simultaneously;
wherein if the second thread encounters an exception while executing in deferred mode, the first thread is configured to restore the architectural checkpoint and resume execution in normal-execution mode and the second thread is configured to commence operation in a wait mode.

9. The apparatus of claim 8, wherein when the second thread completes executing the deferred instructions, if the first thread has not deferred instructions since the second thread entered deferred mode:

the first thread is configured to discard all previously generated checkpoints and resume normal-execution mode; and
the second thread is configured to resume wait mode.

10. The apparatus of claim 9, wherein when the second thread completes executing the deferred instructions, if the first thread has deferred additional instructions since the second thread entered deferred mode:

the first thread is configured to:
discard the architectural checkpoint;
convert the speculative checkpoint to the architectural checkpoint; and
continue execution in execute-ahead mode; and
the second thread is configured to resume wait mode.

11. The apparatus of claim 10, wherein when a data-dependent stall condition which caused the first thread to defer instructions while the second thread was executing in deferred mode is resolved:

the first thread is configured to perform a speculative checkpoint and continue execution in execute-ahead mode; and
the second thread is configured to commence execution in deferred mode, wherein the second thread executes instructions from the deferred queue.

12. The apparatus of claim 8, wherein if the first thread encounters a non-data dependent stall condition during execute-ahead mode:

the first thread is configured to generate a speculative checkpoint and commence execution in scout mode; and
when the data-dependent stall condition which caused the first thread to defer instructions is resolved, the second thread is configured commence execution in a deferred mode, wherein the second thread executes the instructions from the deferred queue.

13. The apparatus of claim 12, wherein when the second thread has executed all the instructions in the deferred queue:
the first thread is configured to:
discard the architectural checkpoint;
convert the speculative checkpoint to the architectural checkpoint;
restore the architectural checkpoint; and
resume normal-execution mode with the first thread; and
the second thread is configured to resume wait mode.

14. A computer system that performs simultaneous speculative threading comprising:
a processor;
a memory coupled to the processor, wherein data and instructions necessary to the operation of the processor are stored in and retrieved from the memory;
a first thread on the processor;
a second thread on the processor;
wherein the first thread is configured to execute instructions in a normal execution mode;
wherein, upon encountering a data-dependent stall condition during an instruction which causes the first thread to enter an execute-ahead mode, the first thread is configured to generate an architectural checkpoint and commence execution of instructions in execute-ahead mode, wherein the first thread executes instructions that can be executed and defers instructions that cannot be executed into a deferred queue, wherein the deferred queue is a first-in-first-out (FIFO) buffer, and wherein deferring the instructions involves storing the instruction that encountered the data-dependent stall condition and subsequent dependent instructions in program order in the deferred queue;
wherein, when the data dependent stall condition has been resolved, the first thread is configured to generate a speculative checkpoint and continue execution in execute-ahead mode and, at the same time, the second thread is configured to commence execution in a deferred mode, wherein the second thread executes the instructions from the deferred queue, and wherein the speculative checkpoint and the architectural checkpoint exist simultaneously;
wherein if the second thread encounters an exception while executing in deferred mode, the first thread is configured to restore the architectural checkpoint and resume execution in normal-execution mode and the second thread is configured to commence operation in a wait mode.

15. The method of claim 1, wherein the data-dependent stall condition includes at least one of:
a use of an operand that has not returned from a preceding load miss;
a use of an operand that has not returned from a preceding translation lookaside buffer (TLB) miss;
a use of an operand that has not returned from a preceding full or partial read-after-write (RAW) from store buffer operation; or
a use of an operand that depends on another operand that is subject to an unresolved data dependency.

* * * * *

UNITED STATES PATENT AND TRADEMARK OFFICE
CERTIFICATE OF CORRECTION

PATENT NO.       : 7,634,641 B2
APPLICATION NO.  : 11/361257
DATED            : December 15, 2009
INVENTOR(S)      : Shailender Chaudhry et al.

It is certified that error appears in the above-identified patent and that said Letters Patent is hereby corrected as shown below:

On the Title Pg Item (57)
In the abstract (line 3), please replace the word "staffs" with the word --starts--.

Signed and Sealed this

Ninth Day of March, 2010

David J. Kappos
*Director of the United States Patent and Trademark Office*